April 26, 1955　　　　C. A. TUCKER　　　　2,707,107
CHUCK FOR HOLDING FINGER RING
Filed April 10, 1951
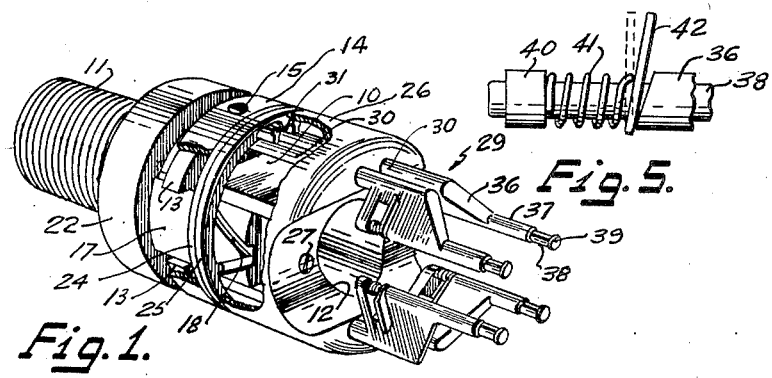
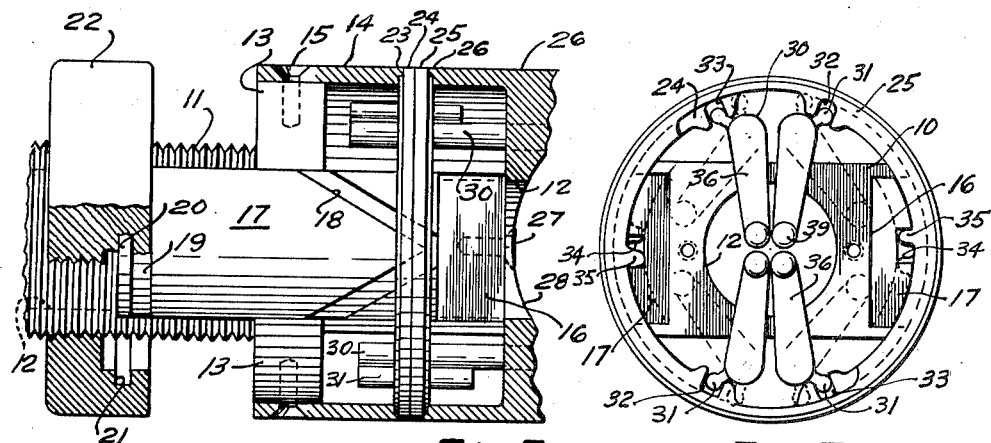
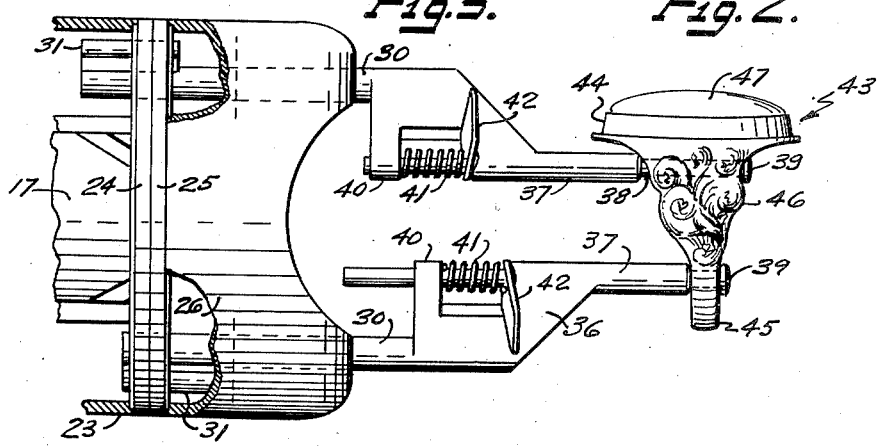
C. A. TUCKER
INVENTOR
BY *Herbert ? Brown*
ATTORNEY

2,707,107

CHUCK FOR HOLDING FINGER RING

Clarence A. Tucker, Fort Worth, Tex.

Application April 10, 1951, Serial No. 220,301

1 Claim. (Cl. 279—2)

This invention relates to jewelry manufacturing equipment, and has reference to a chuck for holding finger rings and the like during certain soldering operations.

An object of the invention is to provide a chuck of the described class which will grip either the inside or outside of a ring or the like. For example, when soldering bezels or the like it is better to grip the inside of the ring so as to provide larger working area on the outside of the ring, but when sizing a ring it is better to grip the outside of the ring so as to draw and hold the abutting ends of the shank together.

Another object of the invention is to provide a ring chuck or the like having longitudinally extensible jaws for holding several rings at one time and which jaws may be conveniently locked in their extended positions.

The invention will be more readily understood by reference to the following description and the accompanying drawings, wherein:

Figure 1 is a perspective view of a ring chuck embodying the features of the present invention, and in which portions of the housing and tubular member are broken away so as to illustrate certain internal parts.

Figure 2 is an enlarged end elevation of the actuating rings and their associated parts.

Figure 3 is a transverse sectional view of the parts illustrated in Figure 2, and additionally showing a part of the housing positioned for turning contact with the outer actuating ring.

Figure 4 is a broken elevation of the outer end of the housing and showing a ring supported upon the jaws of the device.

Figure 5 is an enlarged side elevation illustrating one of the locks for engaging one of the slidable ring holders.

The form of the invention shown includes a body 10 substantially square in transverse cross section, as particularly shown in Figure 2, and has a threaded adapter 11 projecting from the rear or base end thereof for securing the chuck to a holder, not shown, or for engagement in a jeweler's lathe or the like. There is an opening 12 through the axial center of the body 10 for carrying out certain operations, such as polishing with a buffer. Arcuate members 13 are integral with and extend from each side of the body 10 adjacent the adapter 11 for supporting a tubular member 14 which is secured in place by means of counter-sunk screws 15. The sides of the body 10 between the arcuate members 13 are provided with longitudinal grooves 16 for slidably engaging lugs 17 having V-shaped grooves 18 in the forward ends thereof. As particularly shown in Figure 3, the apex ends of the V-shaped grooves 18 meet at the forward end of the lugs 17. The outer surfaces of the lugs 17 are arcuate and are grooved, as at 19, on the rearward ends thereof so as to provide a shoulder 20 for engaging an internal annular groove 21 in an adjusting nut 22 which is threadedly mounted on the adapter 11.

The forward end of the tubular member 14 is shouldered, as at 23, for rotatably engaging a shoulder actuating ring 25, the latter being engaged by the shouldered rearward end of a housing 26. The housing 26 is secured to the body 10 by means of screws 27 in the forward end thereof, as shown in Figure 1. The forward end of the housing 26 is provided with an arcuate transverse groove 28 to accommodate tools during certain jewelry making operations.

Offset jaws 29 are pivotally mounted in and extend from the forward end of the housing 26, and are arranged in pairs positioned relatively close to each other on opposite sides of the arcuate groove 28. The jaws 29 include shafts 30 on their inner ends and which shafts extend inwardly through the tubular member 14 and adjacent the inner peripheries of the rings 24 and 25. Laterally projecting lugs 31 on the shafts 30 engage notched recesses 32 and 33 in the respective rings 24 and 25. The last referred to engagement with the rings 24 and 25 has to do with each of the adjacent pairs of jaws 29 for operating each said pair in unison, but wherein each jaw of said pair of jaws will rotatably move in the opposite direction. The last referred to operation is carried out by reason of inwardly projecting lugs 34 and 35 in the respective rings for engaging the V-shaped grooves of the sliding lugs 17.

Each jaw 29 is inwardly offset, as at 36, where it is provided with a tubular extension 37 for longitudinally and slidably retaining ring holders 38 having heads 39 on their outer ends. As shown in Figure 4, the slidable ring holders extend through the rearward ends of the offset portions 36 of the jaws 29 and extend through projections 40 integral with the jaw shafts 30. A coiled compression spring 41 is mounted around each holder 38 and bears against a flat latch 42 loosely mounted on said holder. The inner surface of the offset portion 36 is angularly formed with respect to the length of the holder 38, and whereby the latch locks said holder in place except when perpendicularly positioned with respect to said holder. When positioned as last referred to the holders 38 may be moved inwardly and outwardly, but become locked when the latches 42 are released.

In operation, the jaws 29 are moved inwardly or outwardly with respect to the axial center of the body 10 by rotating the adjusting nut 22 which moves the lugs 17 inwardly and outwardly, thus causing the rings 24 and 25 to rotate in opposite directions and act upon the separate lugs 31 of the respective pairs of jaws 29 for carrying out said operation. By adjusting the holders 38 inwardly and outwardly, a ring 43 may be held firmly in the manner illustrated in Figure 4 for soldering bezel 44 in place. When sizing a ring the jaws 29 are placed around the ring so as to compress the latter and hold the abutting ends together for the soldering operation. It is also pointed out that the jaws 29 are also mounted to slide longitudinally for accommodating the shape of the ring and whereby both the shank 45 thereof and the ornamental sides 46 adjacent the stone 47 may be accommodated. By reason of the axial opening 12 through the body 10, elongated buffers may be conveniently used for polishing the inside of the ring 43. During the last referred to operation, the jaws 29 are mounted on the outside of the ring 43. When polishing the outside of the ring 43 the jaws 29 are positioned on the inside of the ring, as shown in Figure 4.

The invention is not limited to the specific construction herein shown and described, but may be made in many ways within the scope of the appended claim.

What is claimed is:

A chuck for holding finger rings comprising a cylindrical body having a relatively large axial opening extending therethrough, inwardly and outwardly offset jaws pivotally connected at their inner ends with said body and having the extending ends thereof arranged parallel with respect to each other, the extending ends of said jaws being of tubular construction, ring holders slidably mounted in said tubular extending ends, means adjustably securing said holders in said extending jaw ends, and means rotating said jaws at their pivoted ends in unison and whereby said extending ends of said jaws are at all times equidistant from the axial center of said body.

References Cited in the file of this patent

UNITED STATES PATENTS

| | | |
|---|---|---|
| 868,471 | Oubridge | Oct. 15, 1907 |
| 993,829 | Horrack et al. | May 30, 1911 |
| 1,952,035 | Bruck | Mar. 20, 1934 |
| 1,982,886 | Swartz | Dec. 4, 1934 |
| 2,403,264 | Cormier | July 2, 1946 |
| 2,453,717 | Long | Nov. 16, 1948 |
| 2,528,873 | Dorman | Nov. 7, 1950 |